United States Patent
Hirao

(10) Patent No.: US 10,578,210 B2
(45) Date of Patent: Mar. 3, 2020

(54) GEAR CHANGE CONTROL SYSTEM AND GEAR CHANGE CONTROL DEVICE

(71) Applicant: SUBARU CORPORATION, Tokyo (JP)

(72) Inventor: Koichi Hirao, Tokyo (JP)

(73) Assignee: Subaru Corporation, Tokyo (JP)

( * ) Notice: Subject to any disclaimer, the term of this patent is extended or adjusted under 35 U.S.C. 154(b) by 290 days.

(21) Appl. No.: 15/613,347

(22) Filed: Jun. 5, 2017

(65) Prior Publication Data

US 2018/0031123 A1 Feb. 1, 2018

(30) Foreign Application Priority Data

Jul. 29, 2016 (JP) .................................. 2016-149279

(51) Int. Cl.
| | | |
|---|---|---|
| *F16H 61/04* | (2006.01) | |
| *F16H 61/02* | (2006.01) | |
| *F16H 59/08* | (2006.01) | |
| *F16H 61/06* | (2006.01) | |
| *F16H 59/02* | (2006.01) | |
| *F16H 59/10* | (2006.01) | |
| *B60W 10/02* | (2006.01) | |

(52) U.S. Cl.
CPC ......... *F16H 61/0437* (2013.01); *F16H 59/08* (2013.01); *F16H 61/0206* (2013.01); *F16H 61/0267* (2013.01); *F16H 61/065* (2013.01); *B60W 10/02* (2013.01); *F16H 59/105* (2013.01); *F16H 2059/0295* (2013.01)

(58) Field of Classification Search
CPC ............. F16H 61/0437; F16H 61/0206; F16H 61/0267; F16H 61/065; F16H 59/08; F16H 59/105; F16H 2059/0295; F16H 61/04
See application file for complete search history.

(56) References Cited

U.S. PATENT DOCUMENTS

2010/0294065 A1 11/2010 Funakoshi et al.

FOREIGN PATENT DOCUMENTS

| JP | 07042823 A | 2/1995 |
|---|---|---|
| JP | 09-217805 A | 8/1997 |

(Continued)

OTHER PUBLICATIONS

Decision to Grant a Patent for JP Patent Application No. 2016-149279, dated Aug. 7, 2018, 03 pages of Office Action and 03 pages of English Translation.

(Continued)

*Primary Examiner* — Huan Le

(74) *Attorney, Agent, or Firm* — Chip Law Group

(57) ABSTRACT

A gear change control system includes: a shift operation member configured to receive a shift range operation; a clutch configured to transmit a torque of an input shaft to an output shaft; a clutch actuator configured to control engagement of the clutch by using a working fluid; a manual valve configured to switch a supply destination of the working fluid to the clutch actuator in accordance with a decided shift range; a shift actuator configured to move the manual valve on the basis of a shift range changing operation of the shift operation member; and an oil pressure control actuator configured to reduce an oil pressure of the working fluid to a target oil pressure after the shift range changing operation received by the shift operation member is started and before the shift actuator moves the manual valve toward a shift range changing destination.

15 Claims, 14 Drawing Sheets

(56) References Cited

FOREIGN PATENT DOCUMENTS

| JP | 10-252876 A | 9/1998 |
| JP | 2009-203998 A | 9/2009 |
| JP | 2014-238126 A | 12/2014 |
| JP | 2016-133201 A | 7/2016 |

OTHER PUBLICATIONS

Office Action for JP Patent Application No. 2016-149279, dated Feb. 20, 2018, 06 pages of Office Action and 05 pages of English Translation.

GEAR CHANGE CONTROL SYSTEM AND GEAR CHANGE CONTROL DEVICE

CROSS-REFERENCE TO RELATED APPLICATIONS

The present application claims priority from Japanese Patent Application No. 2016-149279 filed on Jul. 29, 2016, the entire contents of which are hereby incorporated by reference.

BACKGROUND

1. Technical Field

The present invention relates to gear change control systems and gear change control devices.

2. Related Art

Conventionally, gear change is performed by using clutches with regard to an automatic transmission. When a clutch is engaged, the clutch transmits torque. When the clutch is disengaged, the clutch stops transmitting the torque. In recent years, wet clutches (hereinafter, also referred to as forward/reverse clutches) have been developed. The wet clutch includes a forward/reverse switching mechanism.

As a method for controlling the clutch, for instance, an oil pressure control method is used. For instance, when changing a shift range, an oil pressure of a piston is reduced to a predetermined oil pressure. The piston presses friction plates toward clutch plates. Thereby, force of the piston pressing the friction plates is reduced, and the clutch is disengaged.

In this case, vibration (hereinafter, also referred to as clutch disengagement shock) may be generated by disengaging the clutch. For instance, when the oil pressure of the piston is rapidly reduced, the friction plates rapidly separate from the clutch plates. This may generate vibration at the clutch plate side.

On the other hand, Japanese Unexamined Patent Application Publication (JP-A) No. H07-42823 discloses a control device configured to control an accumulator in accordance with increase in idling revolution of an engine when changing a shift range in the case where the accumulator is included in an automatic transmission. In this device, the accumulator increases an oil pressure, and it is possible to suppress the rapid reduction in the oil pressure. As a result, the vibration is considered to be suppressed.

However, the conventional technologies such as the invention disclosed in JP-A. No H07-42823 include a problem that manufacture of the automatic transmission becomes difficult. For instance, the invention disclosed in JP-A. No H07-42823 uses the accumulator for suppressing the clutch disengagement shock. Therefore, cost for installing the accumulator is additionally necessary. Specifically, cost for manufacturing or purchasing the accumulator is necessary. In addition, a space for installing the accumulator is also necessary.

SUMMARY OF THE INVENTION

Accordingly, it is desirable to provide a system capable of suppressing the clutch disengagement shock while increase in cost for manufacturing automatic transmissions is suppressed.

An aspect of the present invention provides a gear change control system including: a shift operation member configured to receive a shift range operation; a clutch configured to transmit a torque of an input shaft to an output shaft; a clutch actuator configured to control engagement of the clutch by using a working fluid; a manual valve configured to switch a supply destination of the working fluid to the clutch actuator in accordance with a decided shift range; a shift actuator configured to move the manual valve on the basis of a shift range changing operation of the shift operation member; and an oil pressure control actuator configured to reduce an oil pressure of the working fluid to a target oil pressure after the shift range changing operation received by the shift operation member is started and before the shift actuator moves the manual valve toward a shift range changing destination.

The target oil pressure may include an oil pressure at which the clutch is engaged and the clutch does not slip.

In addition, the target oil pressure may include an oil pressure at which the clutch slips.

In addition, the oil pressure of the working fluid may be reduced to the target oil pressure as a time elapses.

In addition, a reduction speed of the oil pressure of the working fluid may change during reduction to the target oil pressure.

In addition, the oil pressure control actuator may control a manner of the reduction in the oil pressure of the working fluid on the basis of information on a factor that triggers a change in a flowability of the working fluid.

In addition, the information on the factor that triggers the change in the flowability of the working fluid may include an oil temperature of the working fluid.

In addition, the oil pressure control actuator may restore the oil pressure of the working fluid in the case where the shift range changing destination is not decided through the shift range changing operation.

In addition, the oil pressure control actuator may control the oil pressure of the working fluid only in the case where a predetermined condition is satisfied.

In addition, the shift operation member may include a shift lever.

In addition, the shift lever may include a mechanism configured to move the shift lever back to a reference position from a position corresponding to a shift range, and the start of the shift range changing operation may include a start of movement of the shift lever from the reference position.

In addition, the oil pressure of the working fluid may be reduced to a first oil pressure that is higher than the target oil pressure when the movement of the shift lever from the reference position starts, and the oil pressure of the working fluid may be reduced to the target oil pressure when the shift range changing destination is decided.

Another aspect of the present invention provides a gear change control device including: an operation detector configured to detect a shift range changing operation; and an oil pressure controller configured to output an instruction to reduce an oil pressure of a working fluid to a target oil pressure after a start of the shift range changing operation is detected and before a shift actuator moves a manual valve toward a shift range changing destination, the manual valve being configured to switch a supply destination of the working fluid to a clutch actuator in accordance with a shift range decided on the basis of the shift range changing operation.

DETAILED DESCRIPTION

Figure 1:
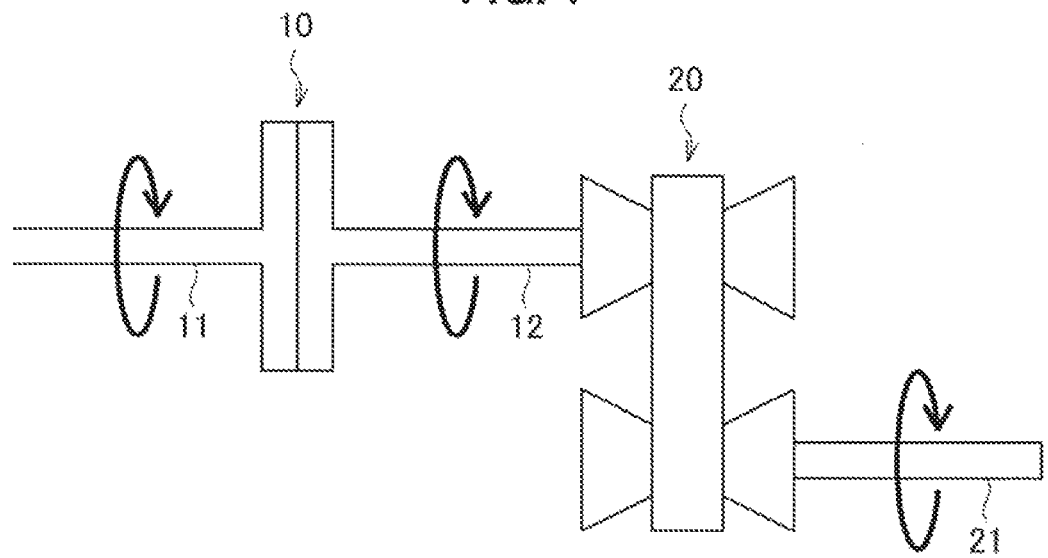
FIG. 1 is an explanatory diagram illustrating clutch disengagement shock.
Figure 1:
Figure 1:
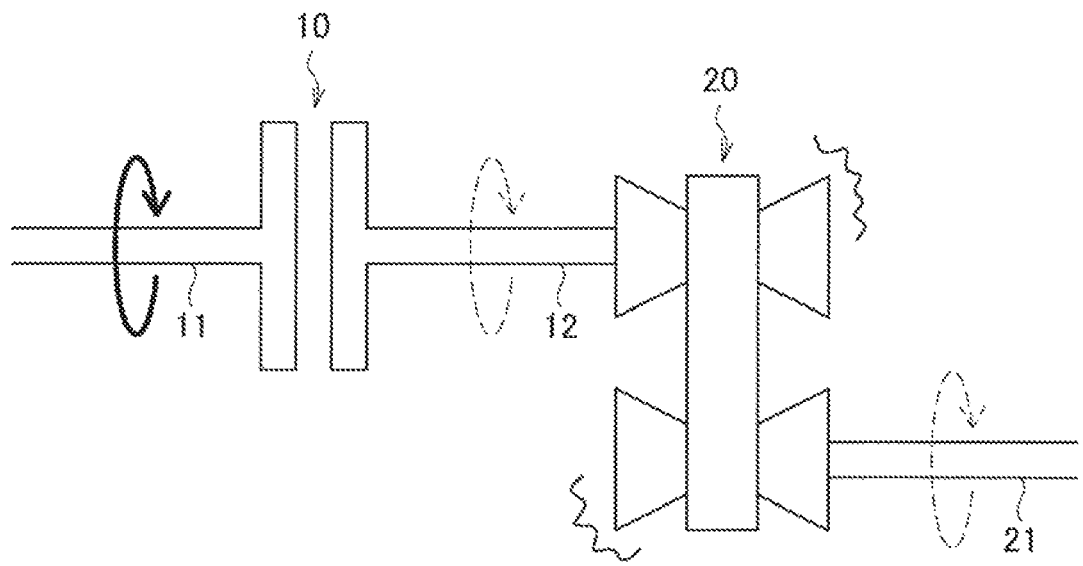

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

1. Introduction

First, with reference to FIG. 1, details of clutch disengagement shock will be described. FIG. 1 is an explanatory diagram illustrating the clutch disengagement shock.

Clutches are part of a transmission, and control transmission of torque output from a power generation device such as an engine. For instance, as illustrated in FIG. 1, an automatic transmission generally includes an input shaft 11 coupled to the power generation device such as the engine, a clutch 10 configured to control transmission of torque input via the input shaft 11, an output shaft 12 configured to transmit the torque from the clutch 10 to a transmission 20, the transmission 20 configured to convert the transmitted torque and revolution speed, and an output shaft 21 configured to transmit the torque converted by the transmission 20.

As illustrated in the top of FIG. 1, the clutch 10 transmits all or a part of torque input from the input shaft 11 to the transmission 20 during engagement or frictional coupling. On the other hand, as illustrated in the bottom of FIG. 1, the clutch 10 does not transmit torque input from the input shaft 11 during disengagement.

In this case, vibration may occur when disengaging the clutch 10 rapidly. For instance, torque remaining at the output shaft 12 side (in other words, torque remaining in transmission 20) at the time of disengagement increases as disengagement speed of the clutch 10 becomes faster. Therefore, as illustrated in the bottom of FIG. 1, the transmission 20 may vibrate due to the remaining torque. On the other hand, when the clutch 10 is disengaged slowly, drivability may deteriorate. For instance, time spent on changing shift ranges increases as disengagement speed of the clutch 10 becomes slower. This may deteriorate responsivity to driver operation when changing the shift range.

Figure 2:
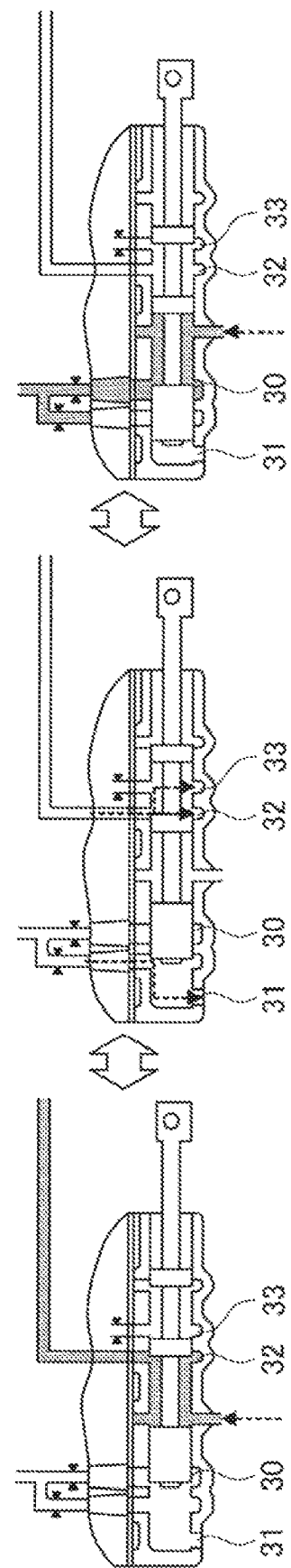
FIG. 2 is an explanatory diagram illustrating operation according to a constant drain circuit method.

Such engagement/disengagement of the clutch 10 is controlled by using an oil pressure, for instance. A method for controlling engagement/disengagement of the clutch 10 by using an oil pressure is roughly classified into a method in which a drain amount of a working fluid is constant (hereinafter, also referred to as constant drain circuit method) and a method in which the drain amount dynamically varies (hereinafter, also referred to as varying drain circuit method). First, with reference to FIG. 2, the constant drain circuit method will be described. FIG. 2 is an explanatory diagram illustrating operation according to the constant drain circuit method.

As illustrated in FIG. 2, according to the constant drain circuit method, a manual valve 30 configured to switch supply destinations of an oil pressure, a working fluid channel, a working fluid valve configured to control flow of a working fluid, drain orifices 31 to 33 through which the working fluid drains, and a drain circuit (not illustrated) configured to control drain of the working fluid are included. The manual valve 30 moves in accordance with change in the shift range, and thereby the working fluid to be supplied to a clutch actuator such as pistons is controlled. Accordingly, the clutch actuator controls engagement/disengagement of a clutch with regard to each shift range. Next, a case where the shift range is changed from a reverse (R) range to a drive (D) range through a neutral (N) range will be described.

For instance, the left side of FIG. 2 illustrates a working fluid supplying state in the R range. In this state, a working fluid is supplied to a reverse clutch side of the clutch actuator by using a pressure obtained from an oil pump or the like, and the reverse clutch is engaged. In the case of changing the shift range to the D range through the N range, the manual valve 30 moves in the left direction of FIG. 2. Thereby, the supply of the working fluid to the reverse clutch side stops, and the working fluid starts to drain into the drain circuit. For instance, when the manual valve 30 moves to a position illustrated in the middle of FIG. 2, the working fluid drains through the drain orifices 32 and 33. Subsequently, an oil pressure at the reverse clutch side of the clutch actuator is reduced due to the drain of the working fluid, and the reverse clutch is disengaged.

Next, when changing the shift range to the D range, the manual valve 30 further moves in the left direction of FIG. 2. At this time, supply of the working fluid to the forward clutch starts as the manual valve 30 moves. When the manual valve 30 moves to a position illustrated in the right side of FIG. 2 and an oil pressure of the working fluid to be supplied to the forward clutch side of the clutch actuator increases, frictional coupling of the forward clutch starts. Subsequently, the forward clutch is engaged when the oil pressure at the forward clutch side of the clutch actuator reaches a predetermined oil pressure or more.

In this case, a drain manner of the working fluid varies in accordance with states of the working fluid. For instance, flowability varies in accordance with variation in an oil temperature of the working fluid. On the other hand, a drain amount is constant in the drain circuit illustrated in FIG. 2. Therefore, when using the constant drain circuit method, drain speed varies in accordance with variation in flowability of the working fluid, and stable behavior of the clutch actuator, that is, stable behavior of the clutch may not be obtained.

Figure 3:
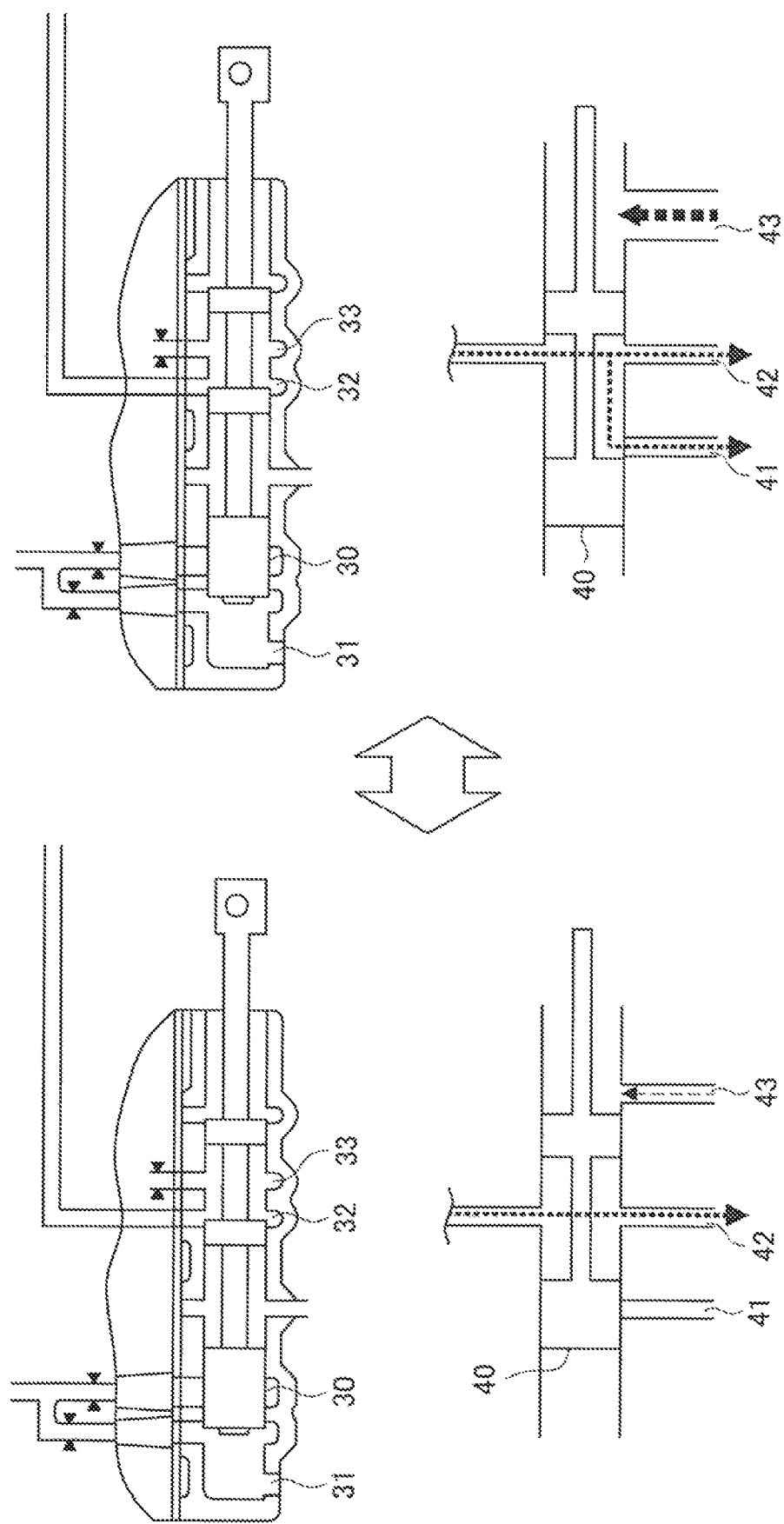
FIG. 3 is an explanatory diagram illustrating operation according to a varying drain circuit method.

To solve this problem, there is the varying drain circuit method in which the drain amount varies dynamically. With reference to FIG. 3, the varying drain circuit method will be described. FIG. 3 is an explanatory diagram illustrating operation according to the varying drain circuit method. Here, a drain manner of the working fluid only in the case of engaging the clutch will be described.

As illustrated in FIG. 3, according to the varying drain circuit method, the manual valve 30, the working fluid channel, the working fluid valve, the drain orifices 31 to 33, and a varying drain circuit configured to dynamically control drain of the working fluid are included. As illustrated in FIG. 3, the varying drain circuit includes a spool 40, two drain orifices 41 and 42, control hole 43, and a solenoid actuator (not illustrated). The working fluid drains through the drain orifices 31 to 33, or drains through the varying drain circuit.

For instance, the spool 40 is moved to a position illustrated in the left side of FIG. 3 by the working fluid flowing through the control hole 43 due to driving of the solenoid actuator. In the case where low-speed drain is desired, the spool 40 stops at the position illustrated in the left side of FIG. 3, and thereby the working fluid drains through the drain orifice 42 alone among the two drain orifices.

On the other hand, in the case where high-sped drain is desired, the spool 40 is moved to a position illustrated in the right side of FIG. 3 by the solenoid actuator increasing the working fluid flowing through the control hole 43. Thereby, the working fluid drains through both of the two drain orifices 41 and 42. This enables increase in an amount of the working fluid draining per unit time more than that of the drain circuit in the state illustrated in the left side of FIG. 3, and it is possible to shorten the drain time.

However, in the case of the high-speed drain as described above, the clutch disengagement shock may occur. Although there are conventional technologies for suppressing the clutch disengagement shock by using an additional structural element such as an accumulator, the additional structural elements may increase cost for manufacturing a transmission. In a similar way, the varying drain circuit requires increased cost for manufacturing a transmission since the structural elements such as the spool and the solenoid actuator are added.

In the case where mechanical control is used as shift range control, the manual valve 30 moves in tandem with movement of the shift operation member that changes the shift range. For instance, the shift lever is mechanically coupled to the manual valve 30, and the manual valve 30 moves in response to shift lever operation. In other words, drain of the working fluid is directly linked to change in the shift range.

On the other hand, in the case where electronic control (so-called shift by wire) is used as the shift range control, movement of the manual valve 30 does not always link to movement of the shift operation member. For instance, the manual valve 30 is moved by an actuator (such as motor) operating in response to a signal corresponding to shift lever operation. In other words, drain of the working fluid is independent from the shift range operation.

Accordingly, examples of the present invention proposes a gear change control system and a gear change control device that use the electronic control as the shift range control and that are capable of suppressing clutch disengagement shock while increase in cost for manufacturing an automatic transmission is suppressed.

2. Example of Present Invention

A gear change control system and gear change control device according to an example of the present invention will be described.

2.1. Configuration of Gear Change Control System

Figure 4:
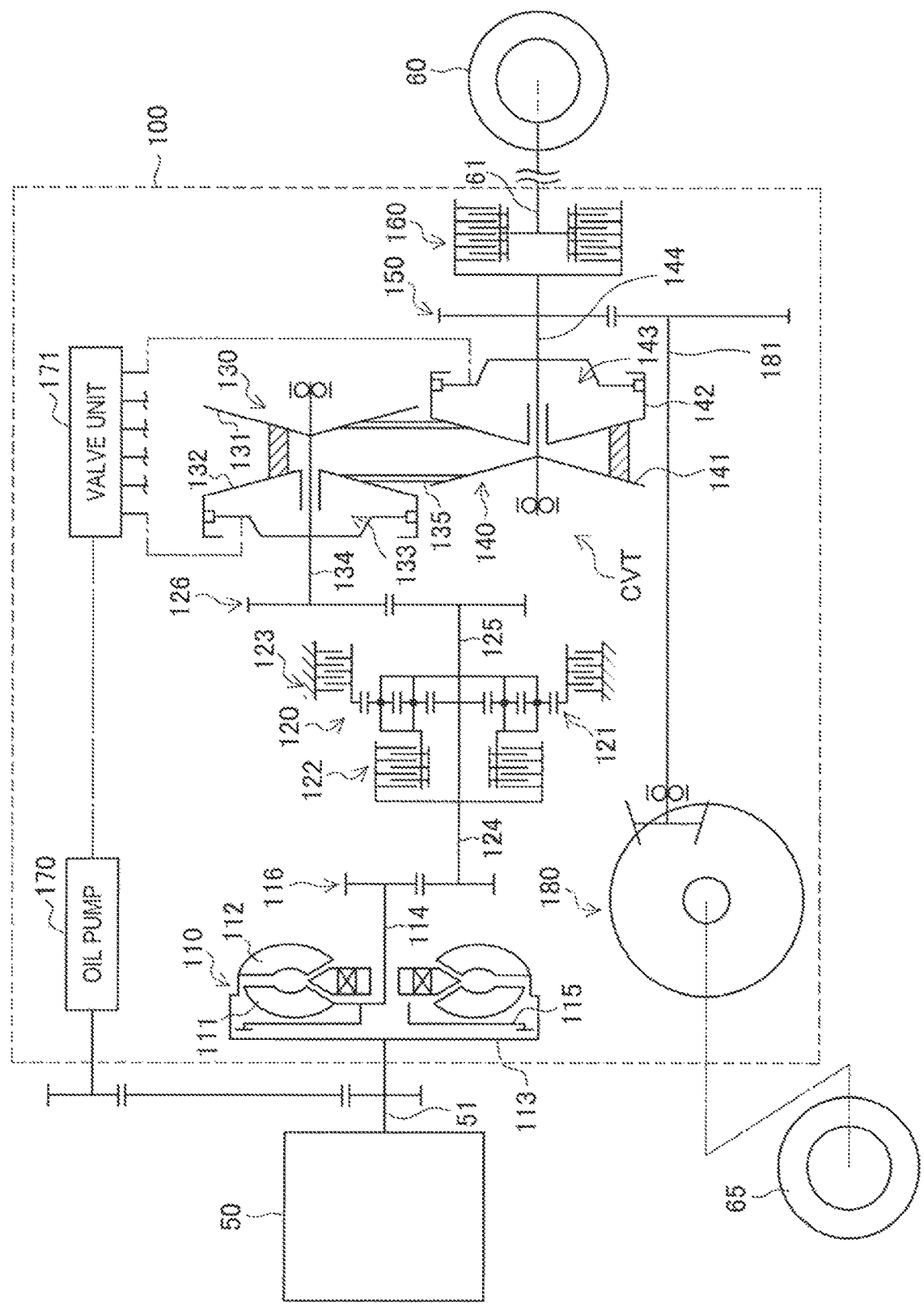
FIG. 4 is a skeleton diagram schematically illustrating an instance of a physical configuration of a gear change control system according to an example of the present invention.

First, with reference to FIG. 4, a configuration of a gear change control system 100 according to the example of the present invention will be described. FIG. 4 is a skeleton diagram schematically illustrating an instance of a physical configuration of the gear change control system 100 according to the example of the present invention.

As illustrated in FIG. 4, the gear change control system 100 includes a torque converter 110, a forward/reverse switching mechanism 120 serving as clutches, continuously variable transmission (CVT) serving as a transmission including a primary pulley 130 and a secondary pulley 140, a gear train 150, and a transfer clutch 160. The gear change control system 100 is coupled to an output side of an engine 50.

The torque converter 110, a gear train 1116, and the forward/reverse switching mechanism 120 are interposed between the engine 50 and the CVT. Torque output from the engine 50 is transmitted to the forward/reverse switching mechanism 120 via the torque converter 110 and the gear train 116. A rotation direction of the torque transmitted from the engine 50 to the forward/reverse switching mechanism 120 is switched to a forward direction or a reverse direction, and then the torque is transmitted to the CVT via an output shaft 125 and a gear train 126.

The torque converter 110 includes a pump impeller 112 and a turbine liner 111. The pump impeller 112 is coupled to a crankshaft 51 of the engine 50 via a front cover 113. The turbine liner 111 faces the pump impeller 112 and is coupled to a turbine shaft 114. A working fluid is supplied to the inside of the torque converter 110. The torque of the engine 50 is transmitted from the pump impeller 112 to the turbine liner 111 through the working fluid. In addition, the torque converter 110 further includes a lock-up clutch 115 configured to directly couple the crankshaft 51 of the engine 50 to the turbine shaft 114.

The forward/reverse switching mechanism 120 includes a planetary gear 121, a forward clutch 122, and a reverse brake (reverse clutch) 123. By controlling the forward clutch 122 and the reverse brake 123, it is possible to switch rotation directions of the output shaft 125. When the reverse brake 123 is disengaged and the forward clutch 122 is engaged, an input shaft 124 coupled to the turbine shaft 114 via the gear train 116 is directly coupled to the output shaft 125. Thereby, the output shaft 125 rotates in a normal rotation direction, and a vehicle can travel in a forward direction. When the forward clutch 122 is disengaged and the reverse brake 123 is engaged, the input shaft 124 is coupled to the output shaft 125 via the planetary gear 121. Thereby, the output shaft 125 rotates in a reverse rotation direction, and the vehicle can travel in a backward direction. When both the forward clutch 122 and the reverse brake 123 are disengaged, the forward/reverse switching mechanism 120 enters a neutral state in which torque of the engine 10 is not transmitted to the output shaft 125. Hereinafter, a set of the forward clutch 122 and the reverse brake 123 may be simply referred to as clutches.

The CVT includes the primary pulley 130, the secondary pulley 140, and a driving belt 135. The driving belt 135 serves as a power transmission member configured to transmit power between the primary pulley 130 and the secondary pulley 140. The primary pulley 130 includes a fixed sheave 131 and a moving sheave 132 that are coupled to a primary shaft 134. The primary pulley 130 includes a primary chamber 133. By adjusting an oil pressure in the primary chamber 133, a position of the moving sheave 132 changes, and a sheave width changes.

The secondary pulley 140 includes a fixed sheave 141 and a moving sheave 142 that are coupled to a secondary shaft 144. The secondary pulley 140 includes a secondary chamber 143. By adjusting an oil pressure in the secondary chamber 143, a position of the moving sheave 142 changes, and a sheave width changes. The primary pulley 130 and the secondary pulley 140 are wound by the driving belt 135. By changing the sheave widths of the primary pulley 130 and the secondary pulley 140 and changing a winding radius of the driving belt 135, continuously variable transmission is possible between the primary shaft 134 and the secondary shaft 144.

The secondary shaft 144 (output shaft of CVT) is coupled to a front wheel output shaft 181 via the gear train 150. The end (left end in FIG. 4) of the front wheel output shaft 181 is coupled to a front wheel (driving wheel) 65 via a front differential mechanism 180. In addition, the secondary shaft 144 is coupled to a rear wheel output shaft 61 via the transfer clutch 160. The transfer clutch 160 switches ON and OFF torque transmission to the rear wheel output shaft 61. The rear wheel output shaft 61 is coupled to a rear wheel (driving wheel) 60 via a propeller shaft and a rear differential mechanism that are not illustrated.

Oil pressures generated by driving an oil pump 170 are supplied to the torque converter 110, the forward clutch 122, the reverse brake 123, the primary chamber 133, the secondary chamber 143, and the transfer clutch 160. The oil pump 170 is a mechanical pump coupled to the crankshaft 51 of the engine 50, and is driven by using driving force of the engine 50. A working fluid that is pumped by the oil pump 170 is supplied to the respective working members via a valve unit 171. The valve unit 171 includes control valves such as electromagnetic valves, and controls amounts of working fluid to be supplied to the respective working members in accordance with working states of the respective working members.

For instance, the valve unit 171 includes the manual valve 30, a drain circuit, and an oil pressure control actuator 70, and supplies an oil pressure to a clutch actuator. The oil pressure supply destination can be switched to the forward clutch 122 side or to the reverse brake 123 side by using the manual valve 30. The manual valve 30 is electronically controlled, and is moved by a shift actuator (such as motor) driving in response to shift range changing operation.

Figure 5:
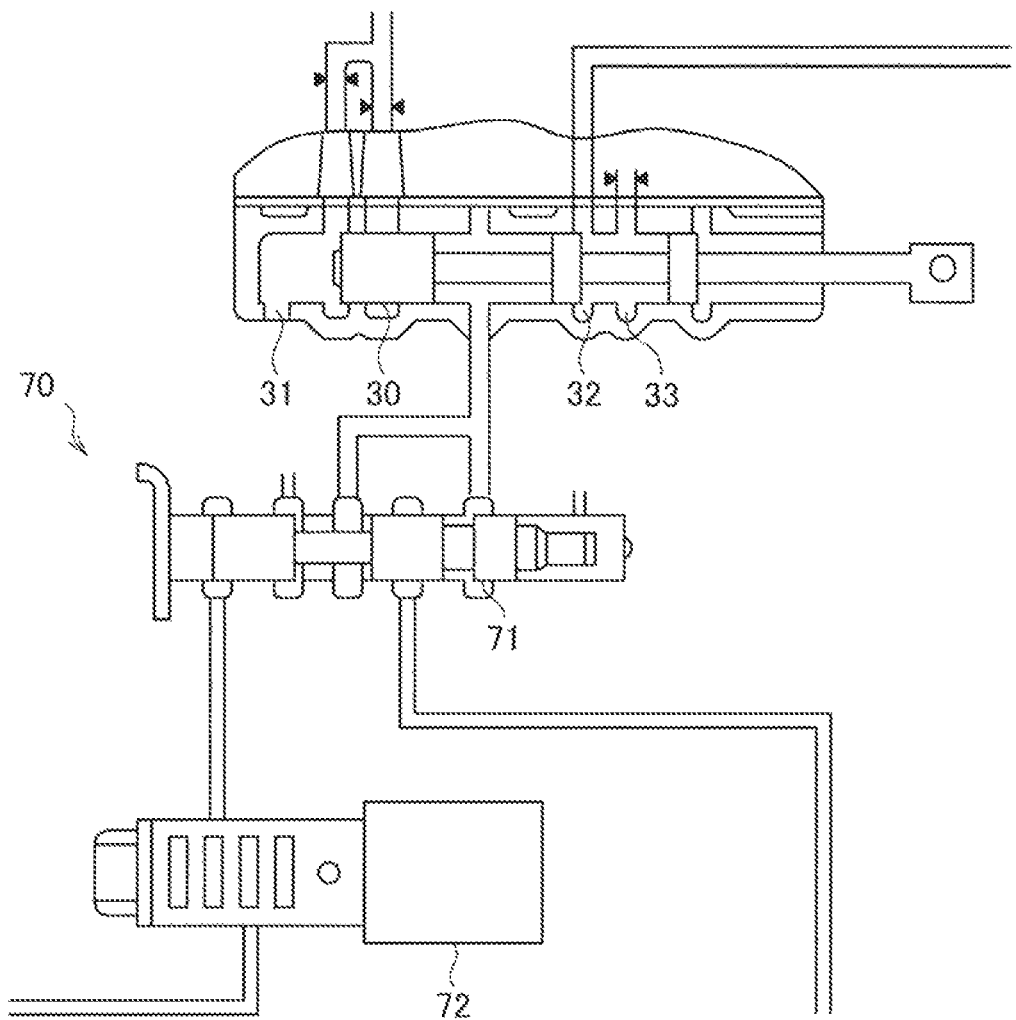
FIG. 5 is an explanatory diagram illustrating an oil pressure control actuator according to the example of the present invention.

The oil pressure control actuator 70 includes a spool 71 and a duty solenoid 72. With reference to FIG. 5, the oil pressure control actuator 70 will be described. FIG. 5 is an explanatory diagram illustrating the oil pressure control actuator 70 according to the example of the present invention. As illustrated in FIG. 5, the oil pressure control actuator 70 includes the spool 71 and the duty solenoid 72. The spool 70 supplies an oil pressure to the clutch actuator by using an oil pressure supplied from the oil pump (hereinafter, also referred to as line pressure). The duty solenoid 72 controls the position of the spool 71. A control pressure (oil pressure) is supplied to the spool 71 via the duty solenoid 72, and the spool 71 moves in accordance with the supplied control pressure. The duty solenoid 72 controls the control pressure (oil pressure) to be supplied to the spool 71. Thereby, the spool 71 moves in accordance with the control pressure controlled by the duty solenoid 72. As a result, the line pressure is adjusted. Subsequently, the adjusted oil pressure is supplied to the clutch actuator. The spool 71 may be controlled by a normal solenoid other than the duty solenoid 72.

The respective control valves included in the valve unit 171 are controlled by a control device (not illustrated). Especially, supply of the oil pressure to the clutch actuator is controlled by a gear change control device 200. Details of the gear change control device 200 will be described later. The drain circuit may be any of the constant drain circuit and the varying drain circuit.

Figure 6:
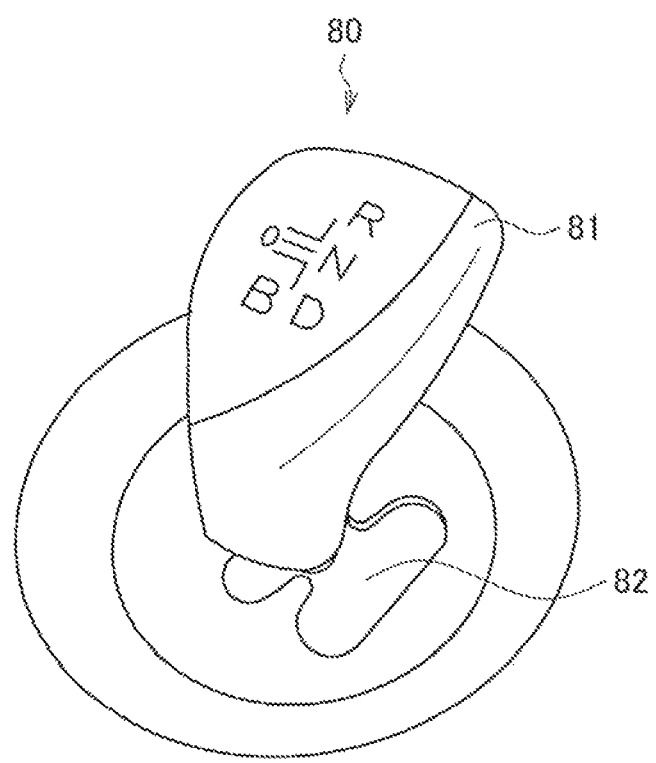
FIG. 6 is a diagram illustrating an instance of a shift lever included in the gear change control system according to the example of the present invention.

Although it is not illustrated in FIG. 4, the gear change control system 100 further includes a shift operation unit 300. Specifically, the shift operation unit 300 includes a shift lever 80 as the shift operation member. With reference to FIG. 6, details of the shift lever 80 will be described. FIG. 6 is a diagram illustrating an instance of the shift lever 80 included in the gear change control system 100 according to the example of the present invention.

As illustrated in FIG. 6, the shift lever 80 includes a lever 81 and a gate 82. For instance, the shift range is changed when a driver moves the lever 81 to a predetermined position along the gate 82. For instance, a position of the lever 81 illustrated in FIG. 6 is set as a home position (reference position). When looking from the driver's point of view, a position at which selection of the R range is recognized is set in the upper right side of the home position, a position at which selection of the N range is recognized is set in the middle right side of the home position, a position at which selection of the D range is recognized is set in the lower right side of the home position, and a position at which selection of the brake (B) range is recognized is set in the lower side of the home position. The shift lever 80 further includes a mechanism configured to moves the shift lever 80 back to the home position from the respective positions corresponding to the shift ranges. For instance, the lever 81 is moved back to the home position when the driver releases his/her hand from the lever 81 after the driver moves the lever 81 to the R range.

The shift operation unit 300 outputs a signal indicating a state of the shift lever 80. Specifically, the shift operation unit 300 outputs a signal related to a position of the lever 81 in the gate 82. For instance, the shift operation unit 300 outputs a home position signal and a shift range signal. The home position signal indicates whether the lever 81 is positioned in the home position, and the shift range signal indicates a shift range changing destination. The home position signal and the shift range signal may be output using different signal lines, or may be represented by different output values while using one signal line.

2.2. Configuration of Gear Change Control Device

Next, with reference to FIG. 7, a functional configuration of the gear change control device 200 will be described. FIG.

7 is a block diagram illustrating an instance of the functional configuration of the gear change control device 200 according to the example of the present disclosure.

Figure 7:
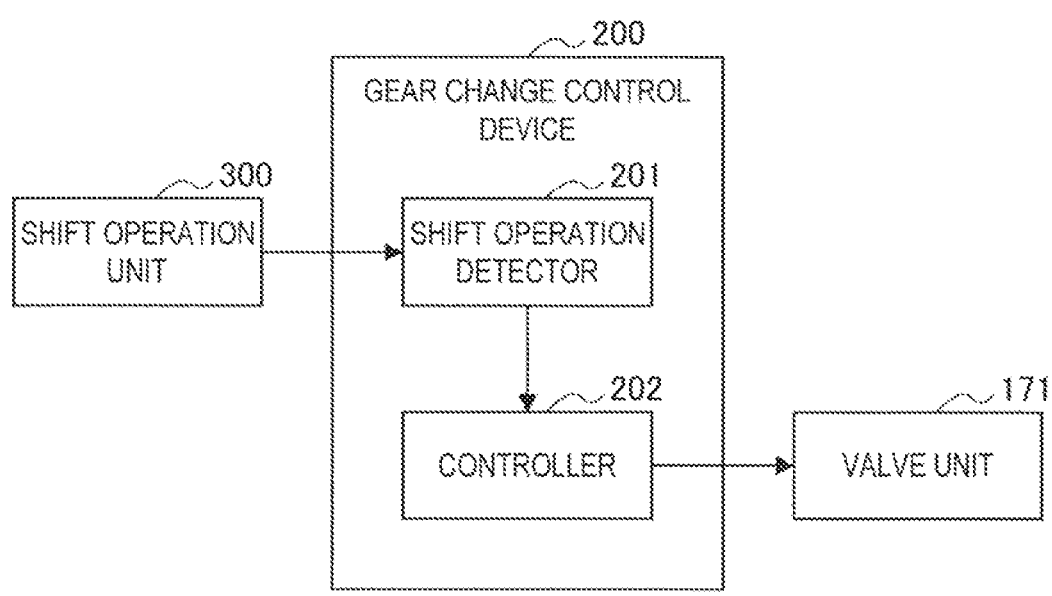
FIG. 7 is a block diagram illustrating an instance of a functional configuration of the gear change control device according to the example of the present disclosure.

As illustrated in FIG. 7, the gear change control device 200 includes a shift operation detector 201 and a controller 202. A signal output from the shift operation unit 300 is input to the gear change control device 200, and the gear change control device 200 outputs a signal to the valve unit 171.

As the operation detector, the shift operation detector 201 detects a shift operation state on the basis of the signal input from the shift operation unit 300. Specifically, the shift operation detector 201 detects shift range changing operation on the basis of the input signal from the shift operation unit 300. For instance, the shift operation detector 201 detects start of the shift range changing operation in the case where the home position signal has been changed from an ON state to an OFF state (in other words, in the case where the lever 81 moves from the home position). On the other hand, the shift operation detector 201 detects end of the shift range changing operation in the case where the home position signal has been changed from the OFF state to the ON state (in other words, in the case where the lever 81 is moved back to the home position). In addition, the shift operation detector 201 detects a shift range changing destination when the shift range signal is input (or when the shift range signal with a predetermined value is detected).

The controller 202 controls a supply destination of an oil pressure to the clutch actuator with regard to a decided shift range. Specifically, the controller 202 changes the supply destination of the oil pressure by moving the manual valve 30 to a position corresponding to a shift range changing destination detected by the shift operation detector 201. For instance, the control unit 202 outputs an instruction to the valve unit 171 to control driving of the shift actuator that moves the manual valve 30.

In addition, as the oil pressure controller, the controller 202 controls an oil pressure to be supplied to the clutch actuator. Specifically, the controller 202 outputs an instruction to the oil pressure control actuator 70 to reduce an oil pressure of a working fluid after start of the shift range changing operation is detected and before the shift actuator moves the manual valve 30 toward a shift range changing destination. More specifically, the controller 202 outputs an instruction to reduce an oil pressure of a working fluid to be supplied to the clutch actuator to a target oil pressure. The target oil pressure is a minimum oil pressure at which clutch is engaged and the clutch does not slip. For instance, the controller 202 moves the spool 71 by changing an oil pressure to be supplied to the spool 71 through the duty solenoid 72 after the shift operation detector 201 detects shift range changing operation and before a shift range changing destination is detected. This reduces an oil pressure to be supplied from the spool 71 to the clutch actuator. As described above, it is possible to reduce an oil pressure (in other words, amount of working fluid) to be supplied to the clutch actuator before drain of the working fluid is started by moving the manual valve 30.

The target oil pressure may be an oil pressure at which the clutch slips. For instance, the target oil pressure may be an oil pressure at which a state of a clutch transitions to a state in which the clutch is not engaged but frictional coupling of the clutch is achieved (so-called half clutch state).

2.3. Workflow of Process

Figure 8:
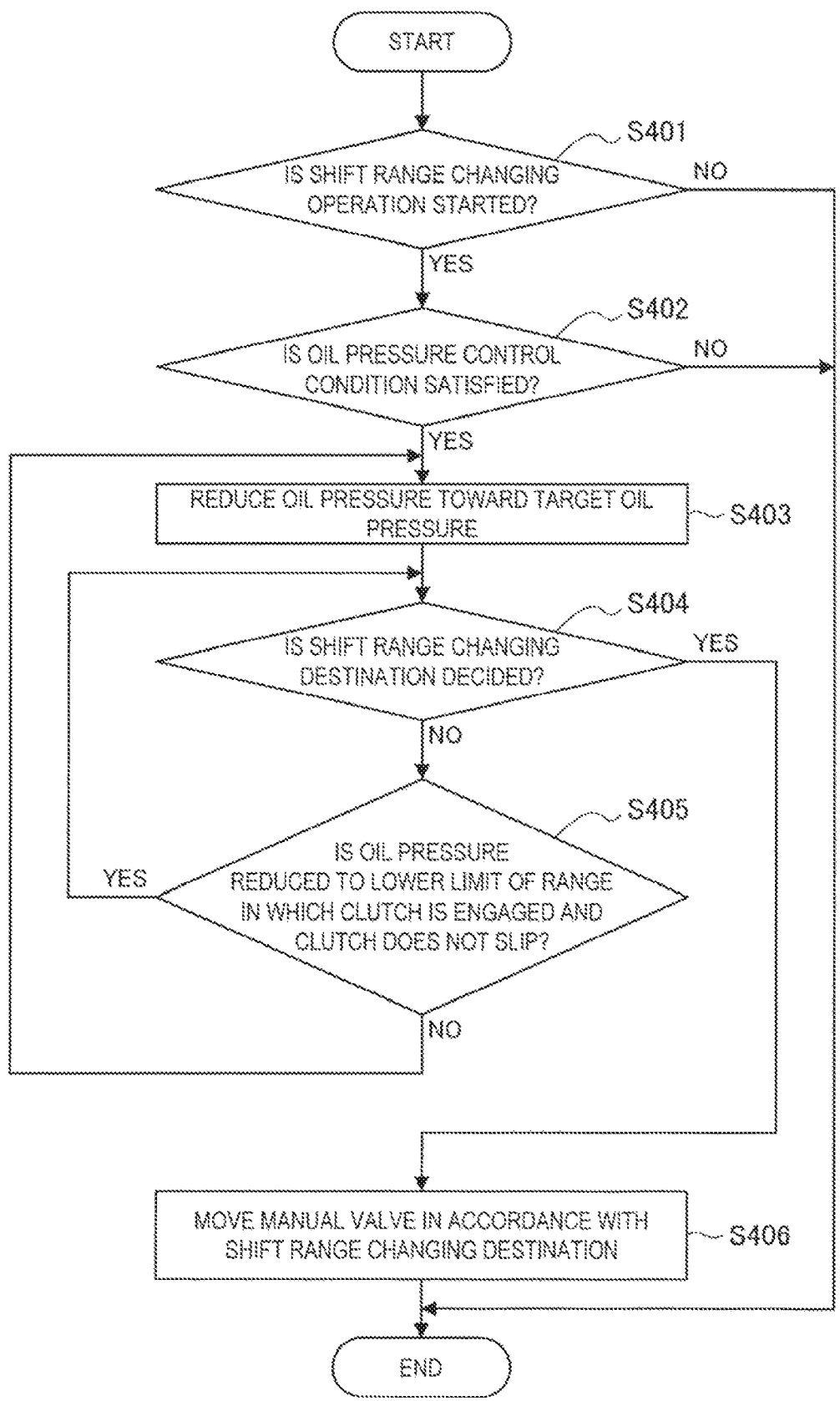
FIG. 8 is a flowchart schematically illustrating an instance of a process performed in the gear change control device according to the example of the present invention.

Next, with reference to FIG. 8, workflow of a process performed in the gear change control device 200 will be described. FIG. 8 is a flowchart schematically illustrating an instance of the process performed in the gear change control device 200 according to the example of the present invention.

The gear change control device 200 determines whether shift range changing operation is started (Step S401). Specifically, the controller 202 determines whether the shift operation detector 201 has detected change in a home position signal input by the shift operation unit 300 from the ON state to the OFF state.

When it is determined that the shift range changing operation is started (YES in Step S401), the gear change control device 200 determines whether an oil pressure control condition is satisfied (Step S402). Specifically, the controller 202 determines: whether to reduce an oil pressure on the basis of predetermined conditions related to vehicle speed; whether the brake has been used; a lower limit of the oil pressure; a position of the shift lever; presence or absence of malfunction in shift range control; whether the engine 50 has stopped; and the like. For instance, the predetermined conditions include whether the vehicle speed is less than a predetermined value, whether a brake control signal indicates an ON state, whether the target oil pressure is the lower limit of the oil pressure or more with regard to requested torque, whether the shift lever is in the home position, and the like. Of course, the plurality of conditions may be combined.

When it is determined that the oil pressure control condition is satisfied (YES in Step S402), the gear change control device 200 reduces the oil pressure toward the target oil pressure (Step S403). Specifically, the controller 202 outputs an instruction to drive the duty solenoid 72 and move the spool 71. Thereby, it is possible to reduce an oil pressure to be supplied to the clutch actuator.

Next, the gear change control device 200 determines whether a shift range changing destination is decided (Step S404). Specifically, the controller 202 determines whether the shift operation detector 201 has detected input of a shift range signal from the shift operation unit.

When it is determined that the shift range changing destination is not decided (NO in Step S404), the gear change control device 200 determines whether the oil pressure is reduced to a lower limit at which the clutch is engaged and the clutch does not slip (Step S405). Specifically, the controller 202 determines whether the oil pressure based on the output instruction reaches the target oil pressure.

In the case where it is determined that the oil pressure is not reduced to the lower limit at which the clutch is engaged and the clutch does not slip (NO in Step S405), the process of the gear change control device 200 returns to Step S403. Specifically, the controller 202 outputs an instruction to further move the spool 71. As described above, the gear change control device 200 gradually reduces the oil pressure to the target oil pressure before the shift range changing destination is decided.

On the other hand, in the case where it is determined that the oil pressure is reduced to the lower limit at which the clutch is engaged and the clutch does not slip (YES in Step S405), the process of the gear change control device 200 returns to Step S404. Specifically, the controller 202 outputs an instruction to keep a current oil pressure since the oil pressure supplied to the clutch actuator has already been reduced to the target oil pressure. For instance, an instruction to keep the position of the spool 71 may be output.

When it is determined that the shift range changing destination is decided (YES in Step S404), the gear change control device 200 moves the manual valve 30 in accordance with the shift range changing destination (Step S406). Specifically, the controller 202 outputs an instruction to drive the shift actuator and move the manual valve 30 to a position corresponding to the shift range changing destination. By moving the manual valve 30, the working fluid drains and the clutch is disengaged.

2.4. Operation Instance

Figure 9:
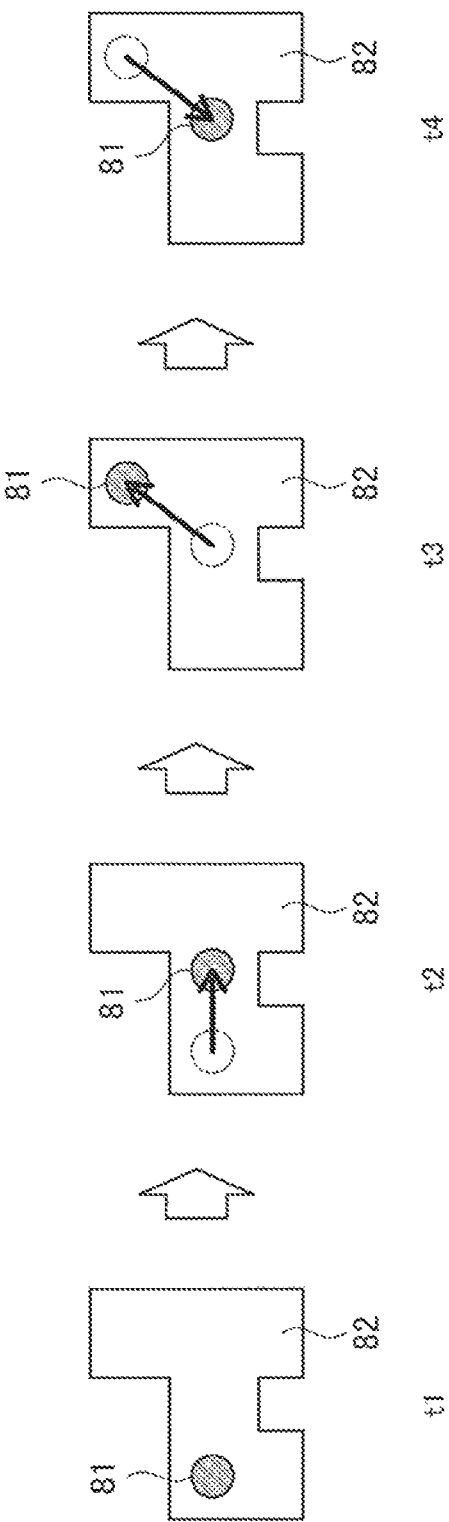
FIG. 9 is a diagram illustrating an operation instance of a shift lever.
Figure 10:
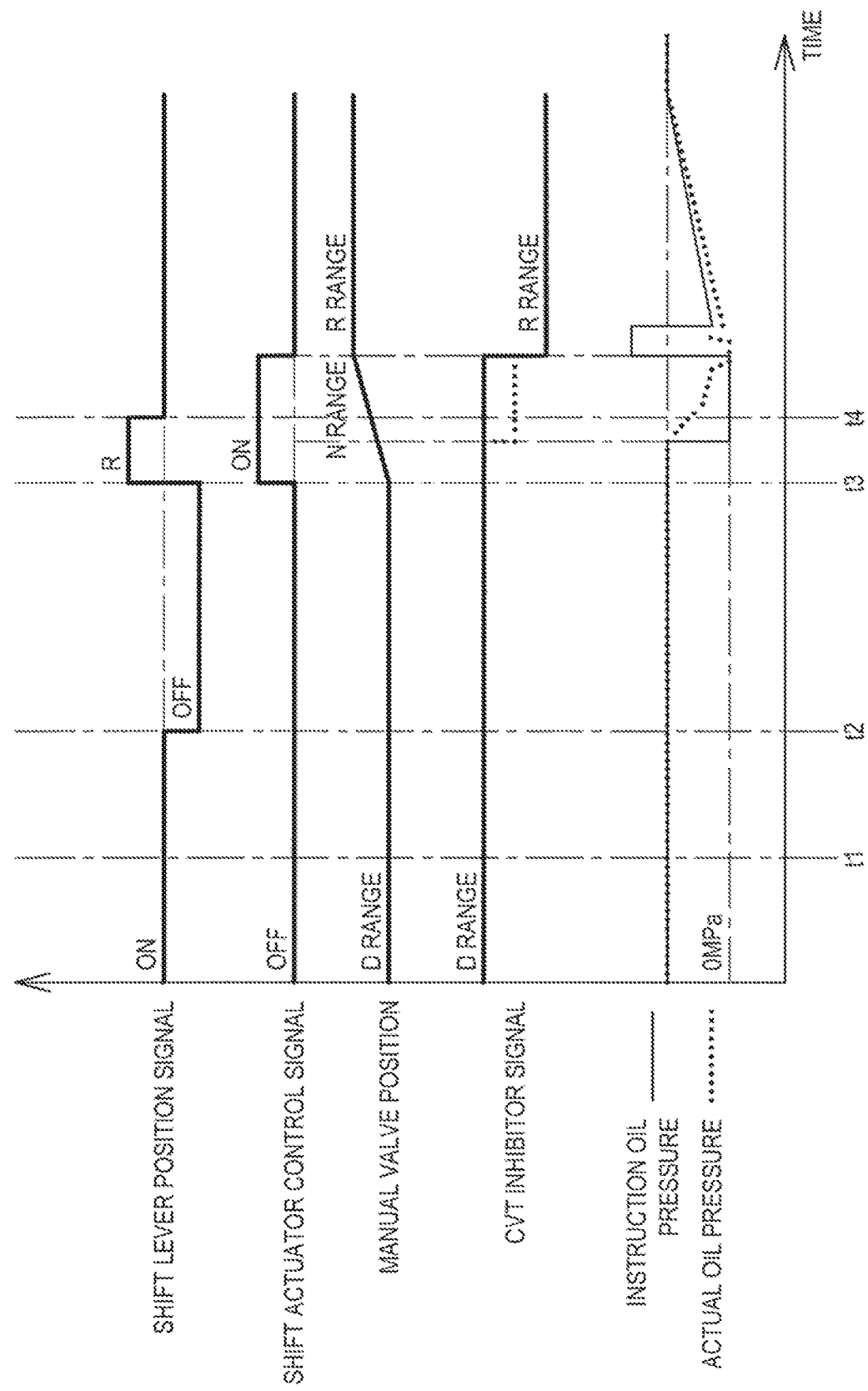
FIG. 10 is a graph illustrating an instance of operation of a conventional gear change control system that is performed in accordance with operation of the shift lever illustrated in FIG. 9.
Figure 11:
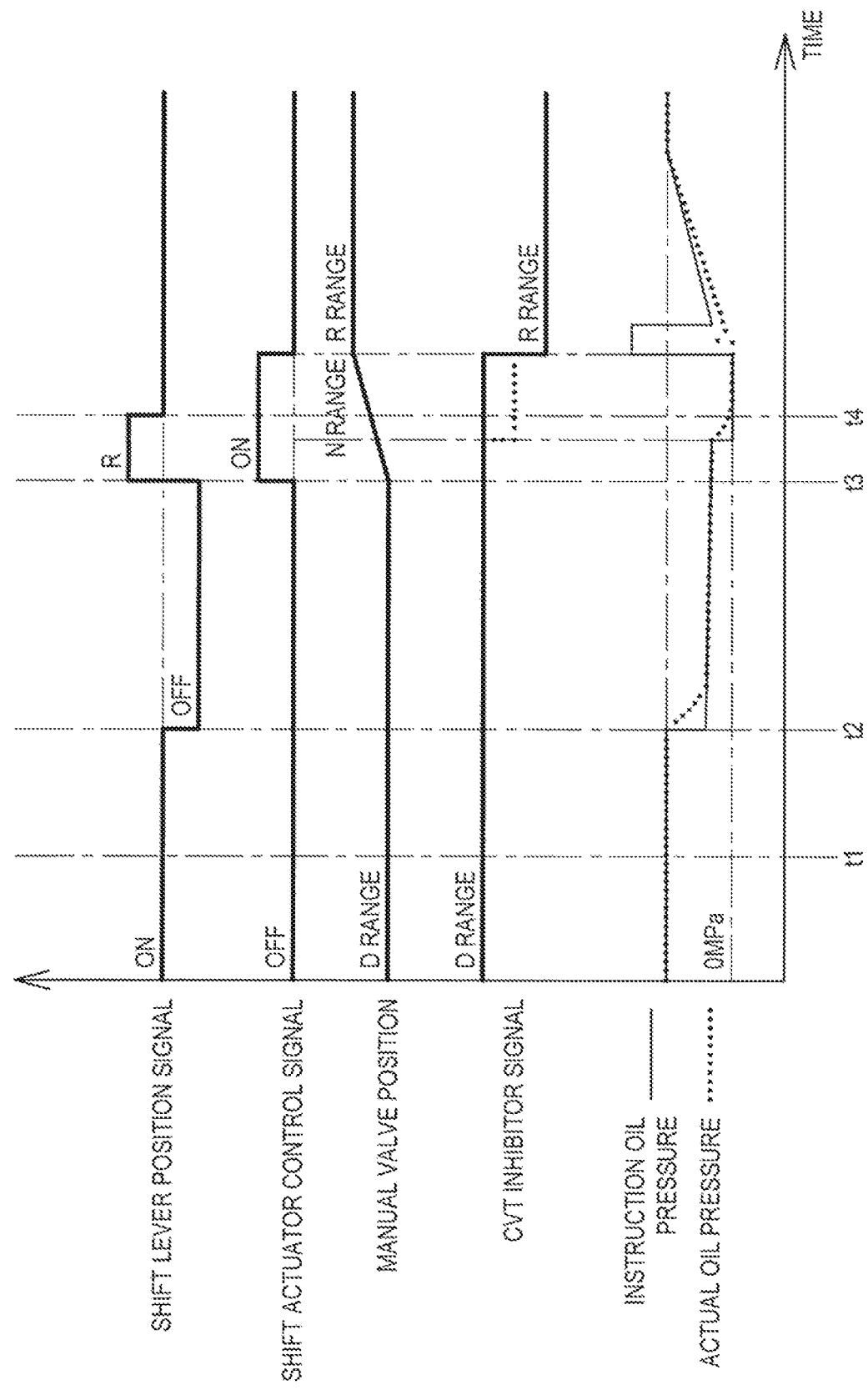
FIG. 11 is a graph illustrating an instance of operation of the gear change control system according to the example of the present invention that is performed in accordance with operation of the shift lever illustrated in FIG. 9.

The gear change control system 100 and the gear change control device 200 according to the example of the present invention have been described above. Next, with reference to FIG. 9 to FIG. 11, an operation instance of the gear change control system 100 will be described in comparison with conventional operation that does not include the oil pressure control described above. FIG. 9 is a diagram illustrating an operation instance of the shift lever. FIG. 10 is a graph illustrating an instance of operation of a conventional gear change control system that is performed in accordance with operation of the shift lever illustrated in FIG. 9. FIG. 11 is a graph illustrating an instance of operation of the gear change control system 100 according to the example of the present invention that is performed in accordance with operation of the shift lever illustrated in FIG. 9. Here, a case in which the shift lever is shifted from the D range to the R range will be described.

(Shift Lever Operation)

First, with reference to FIG. 9, operation of the shift lever will be described. A position of the lever 81 at time t1 illustrated in FIG. 9 is the home position. The lever 81 moves in the gate 82. For instance, the lever 81 moves to the right from the home position at time t2. At this time, it cannot be determined which of the shift ranges the lever 81 moves to, the shift ranges including the R range, N range, and D range. Next, the lever 81 moves to the upper right position (position corresponding to R range) at time t3. A shift range changing destination is decided at this time. Subsequently, the lever 81 moves back to the home position at time t4.

(Operation of Conventional Gear Change Control System)

Next, with reference to FIG. 10, operation of a conventional gear change control system in the case where operation of the shift lever illustrated in FIG. 9 is performed will be described. FIG. 10 illustrates a graph indicating a shift lever position signal (corresponding to home position signal and shift range signal described above), a shift actuator control signal, a manual valve position, a CVT inhibitor signal, an instruction oil pressure, and an actual oil pressure. Time t1 to time t4 in FIG. 10 respectively correspond to the time t1 to time t4 illustrated in FIG. 9.

First, in the time t1, the shift lever signal is ON since the lever 81 is positioned in the home position. In addition, the shift actuator signal is OFF, and therefore the manual valve stays in a position corresponding to the D range. In addition, the CVT inhibitor signal also indicates the D range. An oil pressure supplied to the clutch actuator is maintained at an oil pressure range in which engagement of the forward clutch is maintained and the clutch does not slip.

Next, at the time t2, the home position signal is changed to the OFF state when the lever 81 moves from the home position. However, since the shift range changing destination has not been decided yet, the manual valve 30 cannot move and the CVT inhibitor signal is still indicating the D range.

Next, when the lever 81 moves to a position corresponding to the R range and the shift lever position signal indicates the R range at the time t3, the shift actuator control signal is changed to the ON state. In other words, the shift actuator starts driving, and the manual valve 30 starts moving. However, the CVT inhibitor signal is still indicating the D range.

Subsequently, when the manual valve 30 moves to a position corresponding to the N range, an instruction to reduce an oil pressure to be supplied to the clutch actuator is output, and the actual oil pressure start reducing in response to the instruction. Specifically, the spool 71 is moved by changing the control pressure supplied by the duty solenoid 72, and the oil pressure to be supplied to the clutch actuator starts reducing. In addition, a working fluid starts draining through a drain orifice that appears due to the movement of the manual valve 30. In this instance, a signal indicating the N range is not output since the CVT inhibitor signal is changed from the D range to the R range.

Next, at the time t4, the lever 81 moves back to the home position, and the shift lever position signal is changed to the ON state. At this time, the manual valve 30 is moving to a position corresponding to the R range, and the drain of the working fluid continues. Here, since the working fluid is viscous, time lag occurs until the actual oil pressure reaches the instruction oil pressure. For instance, although the instruction oil pressure indicates 0 MPa at the time t4, the actual oil pressure is not reduced to the instruction oil pressure.

Subsequently, when the manual valve 30 moves to the position corresponding to the R range, the CVT inhibitor signal indicates the R range, and the instruction oil pressure increases accordingly. In other words, an instruction to engage the clutch (reverse brake) in the R range is output. On the other hand, the actual oil pressure is not reduced to the instruction oil pressure even immediately before the manual valve 30 arrives at the position corresponding to the R range. Therefore, the working fluid drains at once to change the shift range. As a result, the clutch (forward clutch) is disengaged rapidly in the D range, and vibration will occur.

(Operation of Gear Change Control System 100)

Next, with reference to FIG. 11, operation of the gear change control system 100 in the case where operation of the shift lever illustrated in FIG. 9 is performed will be described. The respective signals and the position of the manual valve 30 are changed as illustrated in FIG. 10. Therefore, repeated detailed description will be omitted.

The respective signals, the position of the manual valve 30, the instruction oil pressure, and the actual oil pressure at the time t1 are to the same as the case illustrated in FIG. 10.

Next, at the time t2, the home position signal is changed to the OFF state when the lever 81 moves from the home position. At this time, the instruction oil pressure is reduced to a target oil pressure, and the actual oil pressure starts reducing. Specifically, the spool 71 is moved by changing the control pressure supplied by the duty solenoid 72, and the oil pressure to be supplied to the clutch actuator starts reducing. This is because the clutch is disengaged even in the case where the shift range changing destination has not been decided yet but the shift range is to be changed to any of the N range and the R range other than the current D range. The target oil pressure is in an oil pressure range in which the engagement of the clutch is maintained. Therefore, the clutch is not engaged again, and it is possible to prevent vibration due to the re-engagement of the clutch (hereinafter, also referred to as clutch engagement shock).

Reduction speed of the instruction oil pressure may be changed before the reduction is finished. For instance, the instruction oil pressure is vertically reduced at the time t2, and further reduced to the target oil pressure as time elapses from the time t2 to time t3. When the instruction oil pressure is reduced to the target oil pressure, the instruction oil pressure is maintained at the target oil pressure. For instance, in the case where the instruction oil pressure is reduced to the target oil pressure at the time t2, the target oil pressure is maintained at the target oil pressure until the manual valve 30 arrives at the position corresponding to the N range.

Next, when the lever 81 moves to the position corresponding to the R range and the shift lever position signal indicates the R range at the time t3, the manual valve 30 starts moving. However, the CVT inhibitor signal is still indicating the D range.

Subsequently, when the manual valve 30 moves to the position corresponding to the N range, the instruction oil pressure is further reduced, and the actual oil pressure is also reduced accordingly. Here, the actual oil pressure has already been reduced to the target oil pressure before the time t3, a reduction amount of the actual oil pressure at this time is lower than the reduction amount of the actual oil pressure according to the conventional technology illustrated in FIG. 10. Therefore, the reduction in the actual oil pressure finishes before the manual valve 30 arrives at the position corresponding to the R range after the time t4. If the reduction in the actual oil pressure does not finish before the manual valve 30 arrives at the position corresponding to the R range, an amount of the working fluid that drains at once becomes lower than the conventional case. In other words, an amount of the working fluid drained through a drain orifice in the working fluid channel in which the manual valve 30 is installed is reduced. Therefore, it is possible to suppress the clutch disengagement shock by reducing an amount of torque that disappears at once.

The instance in which the instruction oil pressure is reduced at the time t2 at which the shift lever position signal is changed to the OFF state (in other words, at which lever 81 moves from home position) has been described above. However, it is also possible for the instruction oil pressure to be reduced at any time between the time t2 to time t3. In addition, the instance in which the instruction oil pressure is reduced in two stages has been described above. However, it is also possible for the instruction oil pressure to be reduced in three stages or in one stage.

2.5. Summary of Example of Present Invention

As described above, the gear change control system 100 according to the example of the present invention includes the shift operation member, the clutches, the clutch actuator, the manual valve, the shift actuator, and the oil pressure control actuator. The shift operation member is configured to receive shift range operation. The clutch is configured to transmit torque from the input shaft to the output shaft. The clutch actuator is configured to control engagement of the clutch by using a working fluid. The manual valve is configured to switch a supply destination of the working fluid to the clutch actuator in accordance with a decided shift range. The shift actuator is configured to move the manual valve on the basis of shift range changing operation performed through the shift operation member. The oil pressure control actuator is configured to reduce the oil pressure of the working fluid to a target oil pressure after the shift range changing operation received by the shift operation member is started and before the shift actuator moves the manual valve toward a shift range changing destination. The gear change control device 200 detects the shift range changing operation. After detecting start of the shift range changing operation, the gear change control device 200 outputs an instruction to reduce the oil pressure of the working fluid to the target oil pressure before the shift actuator moves the manual valve toward the shift range changing destination.

Conventionally, an oil pressure supplied to the clutch actuator is reduced after a shift range changing destination is decided. Therefore, in the case where the reduction in the oil pressure does not finish before change in the shift range finishes, the clutch is disengaged rapidly, and this may cause vibration. In addition, conventionally, it has been proposed to reduce clutch disengagement shock by adding a structural element such as the accumulator. However, cost for manufacturing the gear change control system may increase in this case due to the addition to the structural element.

On the other hand, according to the example of the present invention, it is possible to reduce an oil pressure to be supplied to the clutch actuator before a shift range changing destination is decided and the manual valve 30 operates. In other words, it is possible to reduce a supply amount of the working fluid. When the manual valve 30 operates, the working fluid drains through the drain orifice. However, it is possible to reduce an amount of the working fluid that drains through the drain orifice by reducing the supply amount of the working fluid in advance. Thereby, it is possible to reduce an amount of the working fluid that drains at once, and it is possible to reduce torque to be transmitted at the time of clutch disengagement. On the other hand, it is possible to control the oil pressure by using the existing oil pressure control actuator 70 configured to supply the oil pressure to the clutch actuator. The additional structural element such as the accumulator is not necessary. Accordingly, it is possible to suppress the clutch disengagement shock and suppress increase in cost for manufacturing an automatic transmission.

The target oil pressure includes an oil pressure at which the clutch is engaged and the clutch does not slip. Here, in the gear change control system 100, the oil pressure is reduced before the shift range changing destination is decided. Therefore, sometimes the shift range does not change actually. In this case, it is possible that the clutch is engaged again and vibration is generated by the re-engagement when the oil pressure has been reduced to an oil pressure at which the clutch can be disengaged. Therefore, by reducing the oil pressure to an oil pressure at which the clutch is not disengaged, it is possible to suppress the clutch re-engagement shock.

The target oil pressure includes an oil pressure at which the clutch slips. Therefore, it is possible to reduce the possibility of the clutch re-engagement shock more by further reducing torque transmitted from the clutch.

In addition, the oil pressure of the working fluid is reduced to the target oil pressure as time elapses. When the oil pressure is reduced to the target oil pressure at once, a variation range of torque to be transmitted through the clutch becomes large. This may generate a harmful effect for a torque transmission destination. Therefore, by reducing the oil pressure as the time elapses, it is possible to suppress the variation range of torque per unit time and suppress the harmful effect.

The reduction speed of the oil pressure of the working fluid changes during reduction to the target oil pressure. To suppress the clutch disengagement shock, it is desirable to complete reducing the oil pressure within time from start of the shift range changing operation to decision of the shift range changing destination. On the other hand, rapid reduction in the oil pressure may generate a harmful effect for a torque transmission destination as described above. Therefore, by changing the oil pressure reduction speed during reduction in the oil pressure, for instance, by setting a first speed at the time of staring the reduction and setting a second speed that is slower than the first speed after a predetermined time elapses, it is possible to suppress the clutch disengagement shock and reduce possibility of the harmful effect for the torque transmission destination.

The oil pressure control actuator controls the oil pressure of the working fluid only in the case where a predetermined condition is satisfied. If the oil pressure is always controlled in the above described manner, behavior that does not match a driver's intention may appear. For instance, when the driver erroneously operates the shift lever during driving a vehicle and the oil pressure is controlled in the above described manner, torque to be transmitted may be reduced, and the vehicle may slow down. On the other hand, by performing the control only in the case where a predetermined condition is satisfied, it is possible to suppress vehicle behavior that has been caused by the erroneous operation and that does not match the driver's intention.

The shift operation member includes the shift lever. In the shift lever operation, time lag between start of change in the shift range and decision of a shift range changing destination occurs. Therefore, it is possible to surely reduce the oil pressure during the time lag. On the other hand, shift levers have been widely spread as gear change operation mechanisms in vehicles that are used by drivers. Therefore, by applying the gear change control system 100 to the shift levers, it is possible to provide improved quietness to drivers with low cost.

The shift lever includes a mechanism configured to moves the shift lever back to a reference position from a position corresponding to a shift range, and the start of the shift range changing operation includes a start of movement of the shift lever from the reference position. Therefore, the movement of the shift lever from the home position corresponds to change in the shift range that causes the working fluid to drain. Accordingly, it is possible to detect the start of the shift range changing operation by monitoring only the home position signal.

3. Modifications

The example of the present invention has been explained above. However, the example of the present invention is not limited to the above described example. Next, first and second modifications of the example of the present invention will be described.

First Modification

Figure 12:
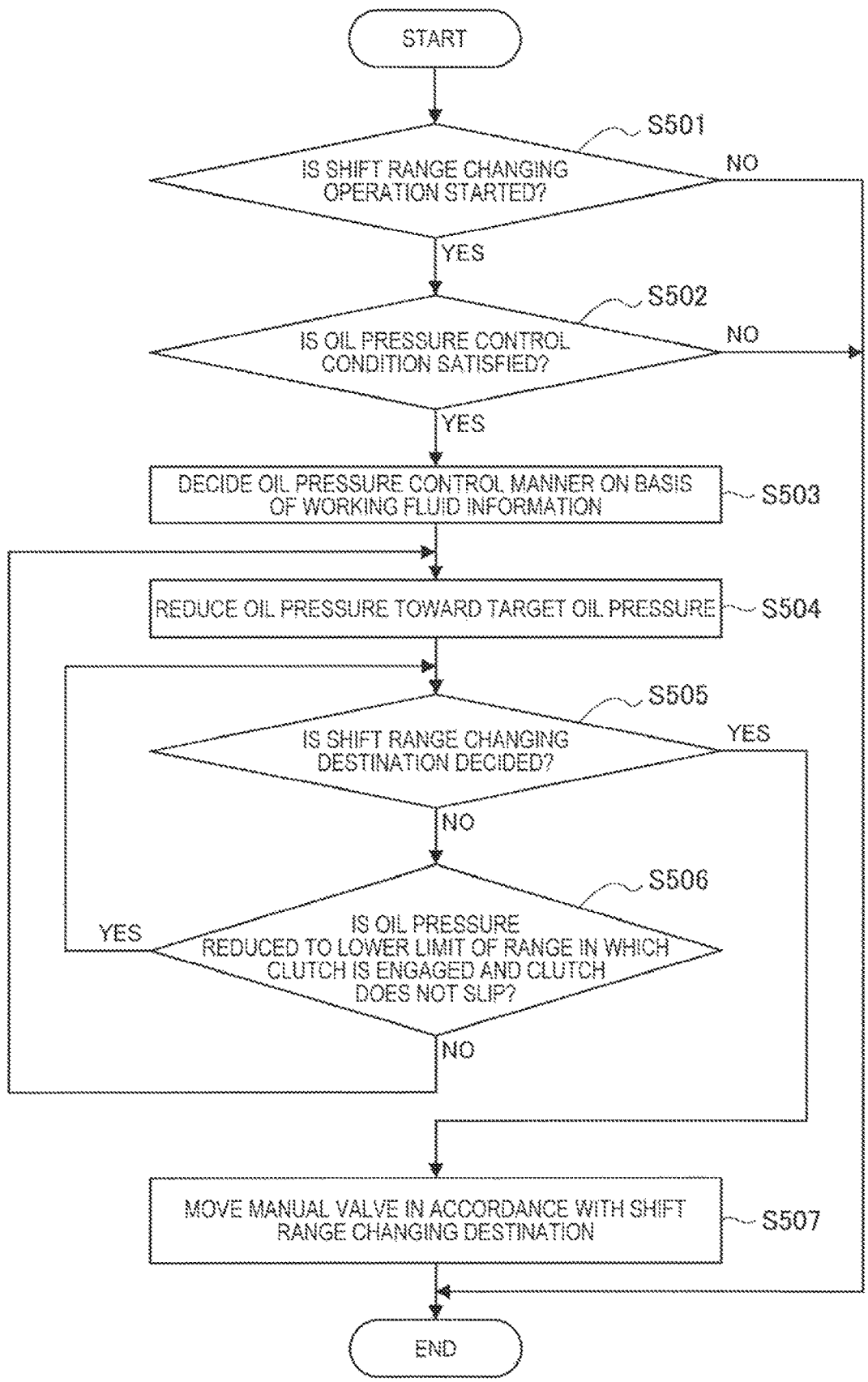
FIG. 12 is a flowchart schematically illustrating an instance of a process performed in a gear change control device according to a first modification of the example of the present invention.

According to the first modification of the example of the present invention, the oil pressure control manner may be decided in accordance with a state of a working fluid. Specifically, the gear change control system 100 controls an oil pressure reduction manner of a working fluid on the basis of information on a factor that triggers change in a flowability of the working fluid (hereinafter, also referred to as working fluid information). Instances of the factor that triggers change in the flowability of the working fluid includes an oil temperature or the oil pressure of the working fluid, temperature or humidity inside/outside of a vehicle, and the like. For instance, the controller 202 in the gear change control device 200 decides parameters for controlling the oil pressure such as a target oil pressure, an oil pressure reduction timing, and an oil pressure reduction speed, on the basis of an input signal indicating the working fluid information. Subsequently, the controller 202 outputs the above described instruction to reduce the oil pressure by using the decided parameters. Next, with reference to FIG. 12, a process performed in the gear change control device 200 according to the first modification will be described. FIG. 12 is a flowchart schematically illustrating an instance of a process performed in the gear change control device 200 according to the first modification of the example of the present invention. Description of a process that is substantially the same as the process described above is omitted.

When it is determined that the shift range changing operation is started (YES in Step S501), the gear change control device 200 determines whether an oil pressure control condition is satisfied (Step S502).

When it is determined that the oil pressure control condition is satisfied (YES in Step S502), the gear change control device 200 decides the oil pressure control manner on the basis of the working fluid information (Step S503). Specifically, the controller 202 decides a control amount of the duty solenoid 72 (in other words, amount of movement of spool 71), a control timing, control duration, and the like on the basis of the working fluid information indicated by a signal input from an outside of the gear change control device 200. Thereby, the oil pressure to be supplied to the clutch actuator, the oil pressure change timing, and the oil pressure change duration that are supplied to the clutch actuator are decided.

Next, the gear change control device 200 outputs an instruction to reduce the oil pressure toward the target oil pressure (Step S504). Specifically, when the shift operation detector 201 detects start of the shift range changing operation, the controller 202 outputs an instruction to the duty solenoid 72 to start supply of an oil pressure with a decided value at a decided timing.

Subsequently, the oil pressure is reduced toward the target oil pressure until a shift range changing destination is decided, and when the shift range changing destination is decided, the shift range is switched by operation of the manual valve 30 (Steps S504 to S507).

As described above, the gear change control system 100 according to the first modification controls an oil pressure reduction manner of a working fluid on the basis of information on a factor that triggers change in a flowability of the working fluid. Here, the working fluid is viscous. In general, flowability of the working fluid changes in accordance with states of the working fluid. Therefore, even if the reduction in the oil pressure starts at the same timing, the oil pressure may not reduce to the target oil pressure or may reduce too much. However, it is possible to stably control the oil pressure by controlling the oil pressure reduction manner on the basis of the working fluid information. Accordingly, it is possible to stably suppress clutch disengagement shock.

The information on the factor that triggers the change in the flowability of the working fluid includes an oil temperature. In general, influence of the oil temperature on the flowability of the working fluid is larger than other factors. Therefore, it is possible to suppress the clutch disengagement shock more effectively by adjusting the oil pressure reduction control manner in accordance with the oil temperature.

Second Modification

Figure 13:
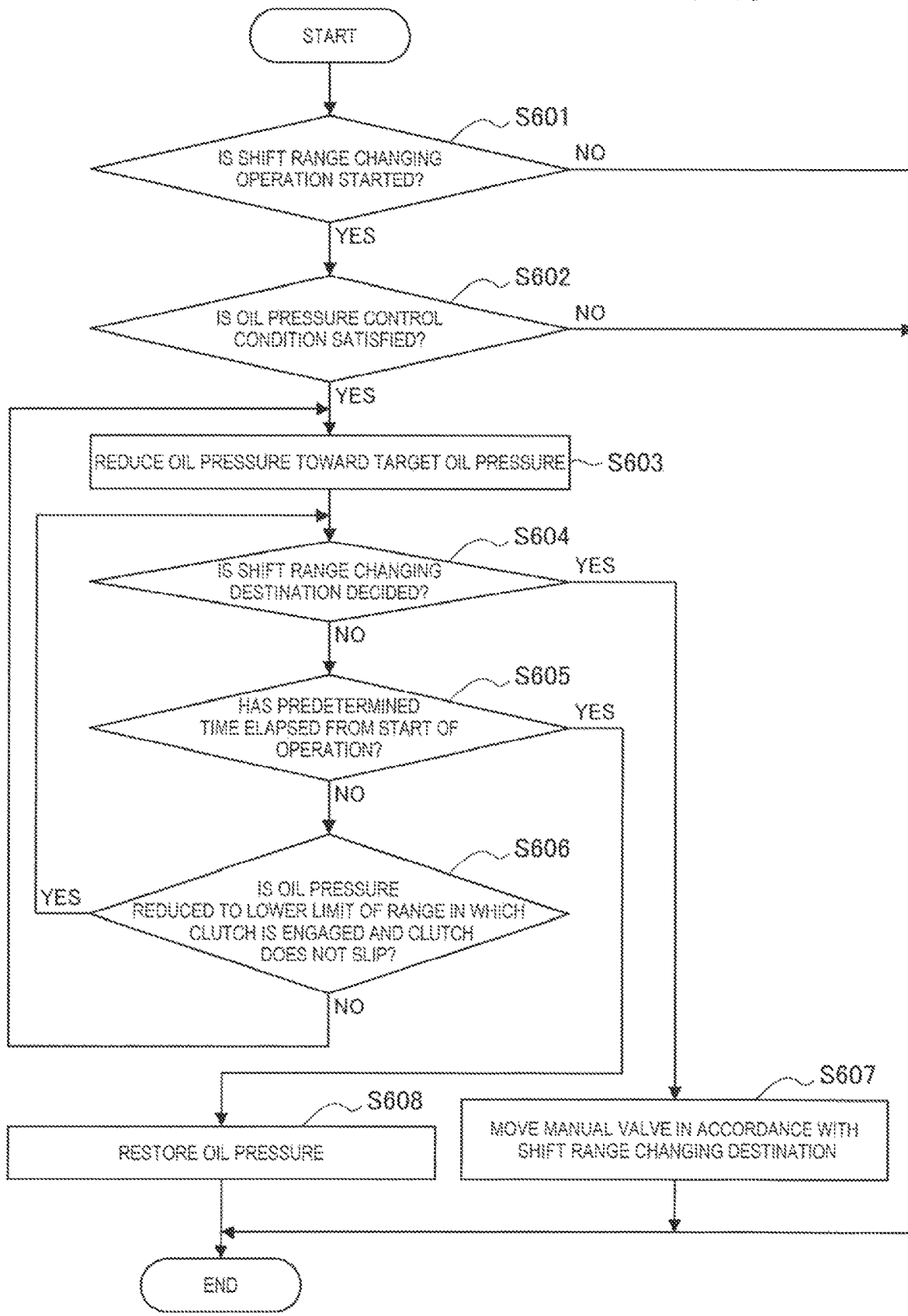
FIG. 13 is a flowchart schematically illustrating an instance of a process performed in a gear change control device according to a second modification of the example of the present invention.

In the case where the shift range has not been changed, the gear change control system 100 according to the second modification of the example of the present invention may restore the oil pressure. Specifically, the gear change control system 100 restores the oil pressure of the working fluid in the case where the shift range changing destination is not decided through the shift range changing operation. For instance, in the case where the shift range changing destination is not detected after predetermined time elapses from time when the shift operation detector 201 detects start of the shift range changing operation, in other words, in the case where the shift range has not been changed, the controller 202 of the gear change control device 200 outputs an instruction to restore the oil pressure to an oil pressure that is not reduced (hereinafter, also referred to as requested oil pressure). The shift range changing destination may be detected by using the CVT inhibitor signal. For instance, the controller 202 outputs an instruction to restore the oil pressure in the case where the CVT inhibitor signal is not switched during predetermined time from output of the oil pressure reduction instruction. Next, with reference to FIG. 13, a process performed in the gear change control device 200 according to the second modification will be described. FIG. 13 is a flowchart schematically illustrating an instance of a process performed in the gear change control device 200 according to the second modification of the example of the present invention. Description of a process that is substantially the same as the processes described above is omitted.

When it is determined that the shift range changing operation is started (YES in Step S601) and it is determined that the oil pressure control condition is satisfied (YES in Step S602), the gear change control device 200 outputs an instruction to reduce the oil pressure toward the target oil pressure (Step S603).

Next, while it is determined that the shift range changing destination is not decided (NO in Step S604), the gear change control device 200 determines whether a predetermined time has elapsed from start of the operation (Step S605). Specifically, the controller 202 determines whether the predetermined time has elapsed from detection of start of the shift range changing operation.

When it is determined that the predetermined time has not elapsed from the start of the operation (NO in Step S605), the gear change control device 200 repeats the process (Step S603 to Step S606) in accordance with whether the oil pressure is reduced to a lower limit of a range in which the clutch is engaged and the clutch does not slip (Step S606).

On the other hand, when it is determined that the predetermined time has elapsed from the start of the operation (YES in Step S605), the gear change control device 200 outputs an instruction to restore the oil pressure (Step S608). Specifically, the controller 202 outputs an instruction to the duty solenoid 72 to move the spool 71 to a position at which an oil pressure corresponding to the requested oil pressure is supplied. In the case where the requested oil pressure is different from the initial oil pressure, the controller 202 outputs an instruction to the duty solenoid 72 to move the spool 71 such that the oil pressure becomes equal to the requested oil pressure.

The instance in which the oil pressure is restored when the predetermined time elapses from the start of the shift range changing operation has been described above. However, it is also possible for the oil pressure to be restored when operation to cancel the shift range changing operation is detected.

As described above, the oil pressure control system 100 according to the second modification restores the oil pressure in the case where the shift range changing destination is not decided through the shift range changing operation. In this case, erroneous operation may be performed since the shift operation member such as the shift lever is operated by a driver. If the oil pressure control is executed in the above described manner by the erroneous operation, vehicle behavior that does not match a driver's intention may appear. Therefore, it is possible to prevent vehicle behavior that does not match the driver's intention by determining the detected operation as the erroneous operation and canceling the oil pressure control in the case where the shift range is not changed. This can suppress giving discomfort to the driver and suppress reduction in drivability.

Third Modification

Figure 14:
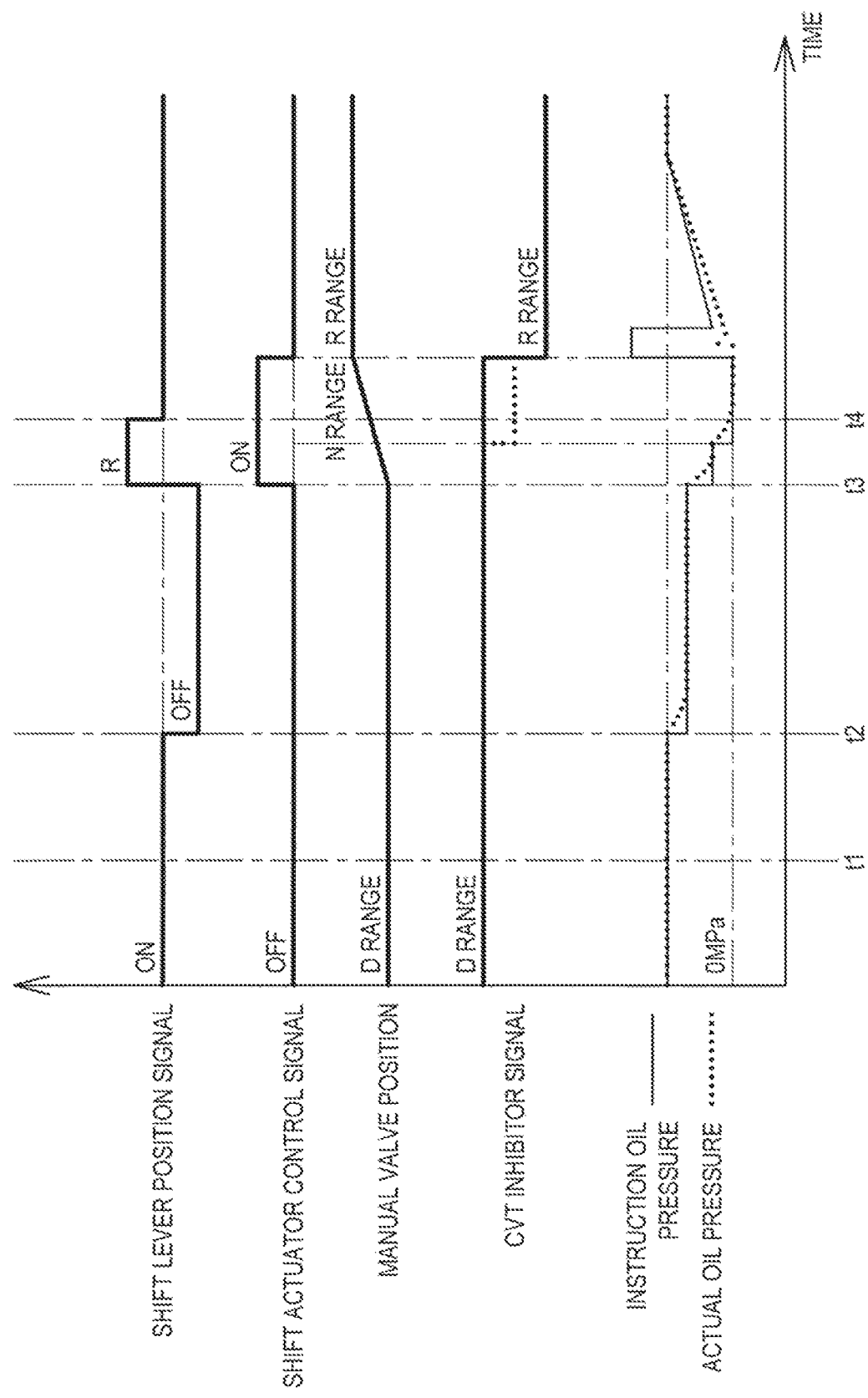
FIG. 14 is a graph illustrating an instance of operation of a gear change control system according to a third modification of the example of the present invention that is performed in accordance with operation of the shift lever illustrated in FIG. 9.

The gear change control system 100 according to a third modification of the example of the present invention may reduce an oil pressure of a working fluid in stages in response to operation of the shift lever 80. Specifically, the controller 202 outputs an instruction to reduce the oil pressure of the working fluid to a first oil pressure that is higher than a target oil pressure when the lever 81 starts moving from the home position, and the controller 202 outputs an instruction to reduce the oil pressure to the target oil pressure when the shift range changing destination is decided. Next, with reference to FIG. 14, operation of the gear change control system 100 according to this modification will be described. FIG. 14 is a graph illustrating an instance of operation of the gear change control system 100 according to the third modification of the example of the present invention that is performed in accordance with operation of the shift lever illustrated in FIG. 9.

The respective signals, the position of the manual valve 30, the instruction oil pressure, and the actual oil pressure at the time t1 are the same as the case illustrated in FIG. 10.

Next, at the time t2, the home position signal is changed to the OFF state when the lever 81 moves from the home position. At this time, the instruction oil pressure is reduced to a first oil pressure that is higher than the target oil pressure, and the actual oil pressure starts reducing. The first oil pressure is an oil pressure at which engagement of the clutch is maintained and the clutch does not slip. Therefore, an amount of torque to be transmitted can be maintained.

Next, when the lever 81 moves to the position corresponding to the R range and the shift lever position signal indicates the R range at the time t3, the manual valve 30 starts moving. At this time, the instruction oil pressure is reduced to the target oil pressure, and the actual oil pressure reduces more. The target oil pressure is an oil pressure at which the clutch slips. Therefore, it is possible to reduce an amount of torque that disappears when the clutch is disengaged.

Subsequently, when the manual valve 30 moves to the position corresponding to the N range, the instruction oil pressure is further reduced, and the actual oil pressure also reduces more. As described above, it is possible to lower an oil pressure that is reduced at once by lowering the oil pressure in advance. Therefore, it is possible to suppress the clutch disengagement shock by reducing an amount of torque that disappears at once.

The instance in which the instruction oil pressure is reduced in two stages in accordance with change of the shift lever position signal to the OFF state and change of the shift lever position signal to R has been described above. However, it is also possible for the instruction oil pressure to be reduced in three or more stages.

As described above, according to the third modification, the oil pressure of the working fluid is reduced to the first oil pressure that is higher than the target oil pressure when the movement of the shift lever from the reference position starts, and the oil pressure of the working fluid is reduced to the target oil pressure when the shift range changing destination is decided. Therefore, it is possible to reduce the oil pressure of the working fluid before the working fluid drains while slip of the clutch before the shift range changing destination is decided is prevented. This enables both prevention of torque reduction before a shift range changing destination is decided and suppression of clutch disengagement shock.

4. Conclusion

As described above, according to the example of the present invention, it is possible to reduce an oil pressure to be supplied to the clutch actuator before a shift range changing destination is decided and the manual valve 30 operates. In other words, it is possible to reduce a supply amount of the working fluid before the shift range changing destination is decided and the manual valve 30 operates. When the manual valve 30 operates, the working fluid drains through the drain orifice. However, it is possible to reduce an amount of the working fluid that drains through the drain orifice by reducing the supply amount of the working fluid in advance. Thereby, it is possible to reduce an amount of the working fluid that drains at once, and it is possible to reduce torque to be transmitted at the time of clutch disengagement. In addition, it is possible to control the oil pressure by using the existing oil pressure control actuator 70 configured to supply the oil pressure to the clutch actuator. Therefore, the additional structural element such as the accumulator is not necessary. Accordingly, it is possible to suppress the clutch disengagement shock and suppress increase in cost for manufacturing an automatic transmission.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For instance, according to the above described examples, the gear change control system 100 and the gear change control device 200 are applied to oil pressure control clutches. However, the present invention is not limited thereto. For instance, the gear change control system 100 and the gear change control device 200 may be applied to a clutch that is controlled to be engaged/disengaged through an electric mechanism (electric control clutch). For instance, the clutch may be engaged/disengaged by driving a motor, or by electromagnetic force.

In addition, although the instance in which the automatic transmission is the CVT has been described above according to the examples, the automatic transmission may be a stepped automatic transmission.

The steps listed in the flow charts in the above described examples does not only include processes that are performed chronologically in the order they are listed, but also include processes that do not have to be performed chronologically but are performed in parallel or individually. It is understood that even steps that are processed chronologically can be in some cases performed in a different order as necessary.

In addition, it is also possible to create a computer program for causing a hardware embedded in the gear change control device 200, to execute functions equivalent to the respective structural elements of the gear change control device 200. Moreover, it is possible to provide a recording medium having the computer program stored therein.

The invention claimed is:

1. A gear change control system, comprising:
a shift operation unit comprising a shift operation member, wherein
the shift operation member is configured to receive a shift range operation, and
the shift operation unit is configured to output a shift range signal that indicates a shift range changing destination;
a shift operation detector configured to detect the shift range signal;
a clutch configured to transmit a torque of an input shaft to an output shaft;
a clutch actuator configured to control engagement of the clutch by using a working fluid;
a manual valve configured to switch a supply destination of the working fluid to the clutch actuator in accordance with a decided shift range;
a shift actuator configured to move the manual valve based on a shift range changing operation of the shift operation member; and
an oil pressure control actuator configured to reduce an oil pressure of the working fluid to a target oil pressure after a start of the shift range changing operation received by the shift operation member, before the shift actuator moves the manual valve toward the shift range changing destination, and before the shift range signal is detected by the shift operation detector.

2. The gear change control system according to claim 1, wherein the target oil pressure comprises an oil pressure at which the clutch is engaged and the clutch does not slip.

3. The gear change control system according to claim 1, wherein the target oil pressure comprises an oil pressure at which the clutch slips.

4. The gear change control system according to claim 1, wherein the oil pressure of the working fluid is reduced to the target oil pressure as a time elapses.

5. The gear change control system according to claim 4, wherein a reduction speed of the oil pressure of the working fluid changes during the reduction to the target oil pressure.

6. The gear change control system according to claim 1, wherein the oil pressure control actuator controls a manner of the reduction in the oil pressure of the working fluid based on information on a factor that triggers a change in a flowability of the working fluid.

7. The gear change control system according to claim 6, wherein the information on the factor that triggers the change in the flowability of the working fluid comprises an oil temperature of the working fluid.

8. The gear change control system according to claim 1, wherein the oil pressure control actuator restores the oil pressure of the working fluid in a case where the shift range changing destination is not decided through the shift range changing operation.

9. The gear change control system according to claim 1, wherein the oil pressure control actuator controls the oil pressure of the working fluid only in a case where a predetermined condition is satisfied.

10. The gear change control system according to claim 1, wherein the shift operation member comprises a shift lever.

11. The gear change control system according to claim 10, wherein the shift lever comprises a mechanism configured to move the shift lever back to a reference position from a position corresponding to a shift range, and the start of the shift range changing operation comprises a start of movement of the shift lever from the reference position.

12. The gear change control system according to claim 11, wherein the oil pressure of the working fluid is reduced to a first oil pressure that is higher than the target oil pressure when the movement of the shift lever from the reference position starts, and the oil pressure of the working fluid is reduced to the target oil pressure when the shift range changing destination is decided.

13. A gear change control device for a gear change control system, the gear change control system comprising:

a shift operation unit comprising a shift operation member, wherein the shift operation member is configured to receive a shift range operation, and the shift operation unit is configured to output a shift range signal that indicates a shift range changing destination;

a clutch configured to transmit a torque of an input shaft to an output shaft;

a clutch actuator configured to control engagement of the clutch by using a working fluid;

a manual valve configured to switch a supply destination of the working fluid to the clutch actuator in accordance with a decided shift range;

a shift actuator configured to move the manual valve based on a shift range changing operation of the shift operation member; and the gear change control device being configured to control the working fluid and comprising:

a shift operation detector configured to detect the shift range changing operation received by the shift operation member and the shift range signal; and an oil pressure controller configured to output an instruction to reduce an oil pressure of the working fluid to a target oil pressure after a start of the shift range changing operation is detected, before the shift actuator moves the manual valve toward the shift range changing destination, and before the shift range signal is detected by the shift operation detector.

14. A gear change control device for a gear change control system, the gear change control system comprising:

a shift operation unit comprising a shift operation member, wherein the shift operation member is configured to receive a shift range operation, and the shift operation unit is configured to output a shift range signal that indicates a shift range changing destination;

a clutch configured to transmit a torque of an input shaft to an output shaft;

a clutch actuator configured to control engagement of the clutch by using a working fluid;

a manual valve configured to switch a supply destination of the working fluid to the clutch actuator in accordance with a decided shift range;

a shift actuator configured to move the manual valve based on a shift range changing operation of the shift operation member; and the gear change control device is configured to control the working fluid and comprising circuitry configured to:

detect the shift range changing operation received by the shift operation member and the shift range signal, and output an instruction to reduce an oil pressure of the working fluid to a target oil pressure after a start of the shift range changing operation is detected, before the shift actuator moves the manual valve toward the shift range changing destination, and before the shift range signal is detected by a shift operation detector.

15. A gear change control system, comprising:

a shift operation unit comprising a shift operation member, wherein the shift operation member is configured to receive a shift range operation, and the shift operation unit is configured to output a shift range signal that indicates a shift range changing destination;

a shift operation detector configured to detect the shift range signal;

a clutch configured to transmit a torque of an input shaft to an output shaft;

a clutch actuator configured to control engagement of the clutch by using a working fluid;

a manual valve configured to switch a supply destination of the working fluid to the clutch actuator in accordance with a decided shift range;

a shift actuator configured to move the manual valve based on a shift range changing operation of the shift operation member; and an oil pressure control actuator configured to reduce an oil pressure of the working fluid to a target oil pressure after the shift range changing operation received by the shift operation member is started, before the shift actuator moves the manual valve toward the shift range changing destination, and before the shift range signal is detected by the shift operation detector, wherein the target oil pressure comprises an oil pressure at which the clutch slips.

* * * * *